United States Patent
Syed et al.

(10) Patent No.: US 9,544,870 B2
(45) Date of Patent: Jan. 10, 2017

(54) NETWORK NODE, WIRELESS SENSOR NETWORK AND METHOD FOR FACILITATING POSITIONING OF A NETWORK NODE IN A WIRELESS SENSOR NETWORK

(71) Applicant: NXP B.V., Eindhoven (NL)

(72) Inventors: Aly Aamer Syed, Deurne (NL); Ewout Brandsma, Eindhoven (NL); Ruud Hendricksen, Beek en Donk (NL); René Geraets, Eindhoven (NL); Theophiel Y. B. van Daele, Valkenswaard (NL)

(73) Assignee: NXP B.V., Eindhoven (NL)

( * ) Notice: Subject to any disclaimer, the term of this patent is extended or adjusted under 35 U.S.C. 154(b) by 97 days.

(21) Appl. No.: 14/446,588

(22) Filed: Jul. 30, 2014

(65) Prior Publication Data

US 2015/0078185 A1 Mar. 19, 2015

(30) Foreign Application Priority Data

Aug. 6, 2013 (EP) ..................................... 13179477

(51) Int. Cl.
| | |
|---|---|
| *H04W 64/00* | (2009.01) |
| *H04W 24/08* | (2009.01) |
| *H04W 4/02* | (2009.01) |
| *G01S 3/30* | (2006.01) |
| *G01S 3/46* | (2006.01) |
| *H04W 84/18* | (2009.01) |

(52) U.S. Cl.
CPC .............. *H04W 64/003* (2013.01); *G01S 3/30* (2013.01); *G01S 3/46* (2013.01); *H04W 4/026* (2013.01); *H04W 24/08* (2013.01); *H04W 84/18* (2013.01)

(58) Field of Classification Search
USPC .................................................. 370/252, 328
See application file for complete search history.

(56) References Cited

U.S. PATENT DOCUMENTS

| | | | |
|---|---|---|---|
| 2006/0020978 A1 | 1/2006 | Miyagawa | |
| 2008/0303637 A1* | 12/2008 | Gelbman ........... | G06K 7/10079 340/10.42 |

(Continued)

FOREIGN PATENT DOCUMENTS

| | | | |
|---|---|---|---|
| CN | 103200675 A | * | 7/2013 |
| EP | 2 278 351 A1 | | 1/2011 |

(Continued)

OTHER PUBLICATIONS

Pfaffenberger, Webster's New World Computer Dictionary, 2001, New York: Hungry Minds, Inc., Ninth Edition, p. 68.*

(Continued)

*Primary Examiner* — Andrew Chriss
*Assistant Examiner* — Jose L Perez

(57) ABSTRACT

There is provided a network node for use in a wireless sensor network, said network node being arranged to determine communication activities of the network node in different spatial directions extending from the network node, and said network node comprising at least one visual indicator being arranged to provide a visual indication of said communication activities. A wireless sensor network comprising such a network node is also disclosed, as is a method facilitating positioning a network node in a sensor network.

15 Claims, 3 Drawing Sheets

(56) References Cited

U.S. PATENT DOCUMENTS

| | | | | |
|---|---|---|---|---|
| 2011/0133987 A1* | 6/2011 | Bernsten | ............... | H04B 7/086 342/417 |
| 2011/0320636 A1* | 12/2011 | Young | .................. | H04W 88/16 709/249 |
| 2012/0088452 A1* | 4/2012 | Jorgensen | ................ | G01S 3/40 455/41.3 |
| 2013/0141223 A1 | 6/2013 | Brandsma et al. | | |

FOREIGN PATENT DOCUMENTS

| | | | | |
|---|---|---|---|---|
| EP | 2 602 677 A1 | 6/2013 | | |
| JP | 2005 244689 A | 9/2005 | | |
| WO | WO 03098815 A2 * | 11/2003 | ........... | G01C 21/206 |
| WO | 2008/112765 A1 | 9/2008 | | |
| WO | 2008/120857 A1 | 10/2008 | | |
| WO | 2010/132761 A2 | 11/2010 | | |
| WO | 2010/132799 A2 | 11/2010 | | |
| WO | WO 2010132799 A2 * | 11/2010 | ......... | G05B 19/4185 |
| WO | WO 2011123893 A1 * | 10/2011 | ............ | H04W 28/06 |
| WO | WO 2012012770 A1 * | 1/2012 | ............... | G01S 5/04 |

OTHER PUBLICATIONS

Extended European Search Report for application No. 13179477.8 (Feb. 20, 2014).

* cited by examiner

NETWORK NODE, WIRELESS SENSOR NETWORK AND METHOD FOR FACILITATING POSITIONING OF A NETWORK NODE IN A WIRELESS SENSOR NETWORK

CROSS-REFERENCE TO RELATED APPLICATIONS

This application claims the priority under 35 U.S.C. §119 of European patent application no. 13179477.8, filed on Aug. 6, 2014, the contents of which are incorporated by reference herein.

FIELD

The present disclosure relates to wireless sensor networks. In particular, the present disclosure relates to a network node for use in a wireless sensor network, a wireless sensor network comprising a plurality of network nodes, and a method for facilitating positioning of a network node in a wireless sensor network.

BACKGROUND

Typically, the installation of a wireless sensor network (WSN) requires the placement of network nodes, for example sensors and/or routers, in optimal locations in an environment, such as a building or a home. Usually this task is carried out by expert installation personnel. The task of determining a suitable position for a WSN node is performed by skilled personnel using special installation equipment.

Sensor nodes may be connected in networks having different network topologies, for example a star topology, a tree topology or a mesh topology. The route via which a message may travel depends strongly on what type of topology is used. For example, in a network based on a star topology, network nodes will always communicate through a central node. In contrast, in a network based on a tree topology or a mesh topology, the messages may take different routes to a destination without necessarily passing through a central node.

In topologies in which messages can take different routes, a network may change its routing such that some routes become heavily used. In such networks, the location of a node in a network has an effect on the behavior of the network. For example, the routing algorithms of the network may choose a path with higher latency based on the relative location of the nodes in the network, which in turn may affect the network application.

Such changes in the message routes may arise due to changes in the building situation over time. For example, some walls may have been added or removed in order to create different rooms. Furthermore, shifting around furniture may affect the signal propagation in the environment, Which may lead to a changed route. In addition to changes in the building structure, the presence of people and electromagnetic interferers may also affect the network.

Installing a WSN in a commercial building or a home may involve measuring the signal strength in the environment and, based on these measurements, placing the WSN nodes in optimal locations. These locations could be optimal with respect to network coverage, message latency and/or node power usage.

When home owners want to install a WSN, they generally do not have access to special installation tools. Furthermore, the methods described in installation instructions for a WSN are usually not intuitive and difficult to follow for unskilled individuals. In home environments, this way of working would require that experts be hired, which would lead to higher costs for a WSN installation.

Even when the networks are designed and installed by experts on the basis of conventional signal strength measurements, dynamic effects—such as changes to a building, movement of furniture, intermittent RF disturbances (e.g. Wi-Fi) and people moving around—will not generally be taken into account. Thus, signal strength measurements as used in conventional WSN installation procedures only provide a static view of the RE conditions in a building or a home. In other words, the view is inherently limited to the RE conditions measured at the time of installation of the WSN. If in the case of a change in the environment the WSN does not work properly, then the experts have to be hired again to perform new signal strength measurements, which is costly and still does not represent a dynamic solution.

SUMMARY

There is provided a network node for use in a wireless sensor network, said network node being arranged to determine communication activities of the network node in different spatial directions extending from the network node, and said network node comprising at least one visual indicator being arranged to provide a visual indication of said communication activities.

According to an illustrative embodiment, the network node is arranged to determine said communication activities by measuring differences in the strength and/or phase of a signal received by different antennas comprised in or attached to said network node.

According to another illustrative embodiment, at least one of the antennas is detachable from the network node.

According to a further illustrative embodiment, the network node is arranged to determine said communication activities by receiving messages from other network nodes, extracting coordinates of the other network nodes from said messages, and using said coordinates to determine the spatial directions from which said messages have been sent.

According to a further illustrative embodiment, the network node is arranged to generate said visual indication in dependence on its spatial orientation.

According to a further illustrative embodiment, the spatial orientation of the network node is pre-set.

According to a further illustrative embodiment, the network node further comprises a compass which is arranged to determine the spatial orientation of the network node.

According to a further illustrative embodiment, said visual indicator comprises a plurality of light-emitting diodes.

According to a further illustrative embodiment, said visual indicator comprises a display unit.

According to a further illustrative embodiment, the display unit comprises electronic ink.

According to a further illustrative embodiment, the network node further comprises a processing element which is arranged to execute an algorithm that maintains a history of message reception and to use said history for determining the communication activities.

According to a further illustrative embodiment, the network node is further arranged to provide a network quality indication based on an error rate of received messages.

According to a further illustrative embodiment, the error rate is one of the group consisting of a bit error rate, a packet error rate and a message error rate.

Furthermore, there is provided a wireless sensor network comprising a plurality of network nodes, at least one network node being of the kind set forth.

Furthermore, a method is conceived for facilitating positioning of a network node in a wireless sensor network, wherein said network node determines communication activities of the network node in different spatial directions extending from the network node, and wherein said network node comprises at least one visual indicator which provides a visual indication of said communication activities.

DESCRIPTION OF DRAWINGS

Various embodiments will be described in more detail with reference to the appended drawings, in which.

DESCRIPTION OF EMBODIMENTS

As mentioned above, there is provided a network node for use in a wireless sensor network, said network node being arranged to determine communication activities of the network node in different spatial directions extending from the network node, and said network node comprising at least one visual indicator being arranged to provide a visual indication of said communication activities. Thus, a dynamic view of the RF conditions in the wireless sensor network may be provided to a user.

In particular, a more intuitive installation of a WSN is enabled by visualizing network traffic routing on individual network nodes through visual indicators, for example light-emitting diodes, that show how a particular network node communicates with neighboring network nodes. Thus, a user is able to see, by means of a visual indication, the extent to which a particular node communicates properly in the network, without the need for specialized instruments or expert skills. This facilitates determining the location where network nodes have to be placed in a building for optimal functioning of the network.

According to an illustrative embodiment of the network node, the node may measure the amount and quality of traffic between itself and its neighbors through signal strength and/or phase differences between different signals received by respective antennas of the node, and activate the visual indicators based on this information, in order to provide the user with an indication as to whether the node is performing well in the network at the current location. The skilled person will appreciate that "signal strength" as used herein may refer to various well-known characteristics of a signal, such as its amplitude and signal-to-noise ratio.

According to another illustrative embodiment of the network node, the node is equipped with a compass so that it may determine its orientation in space. In this embodiment, the node is provided with location data representing the node's coordinates within the building, for example during a so-called commissioning operation at the time of its installation. When communicating, the node sends its coordinates, which may for instance be Cartesian coordinates (x, y, z), in messages to other nodes, such data receiving node may determine the direction from which a message was sent using its own coordinates and the coordinates of the sending node, and generate a visual indication based on said direction. Also, the receiving node may take its spatial orientation with respect to 'North' into account when generating said visual indication. For example, the node may use its spatial orientation in order to determine which of a plurality of visual indicators has to be activated.

Figure 1:
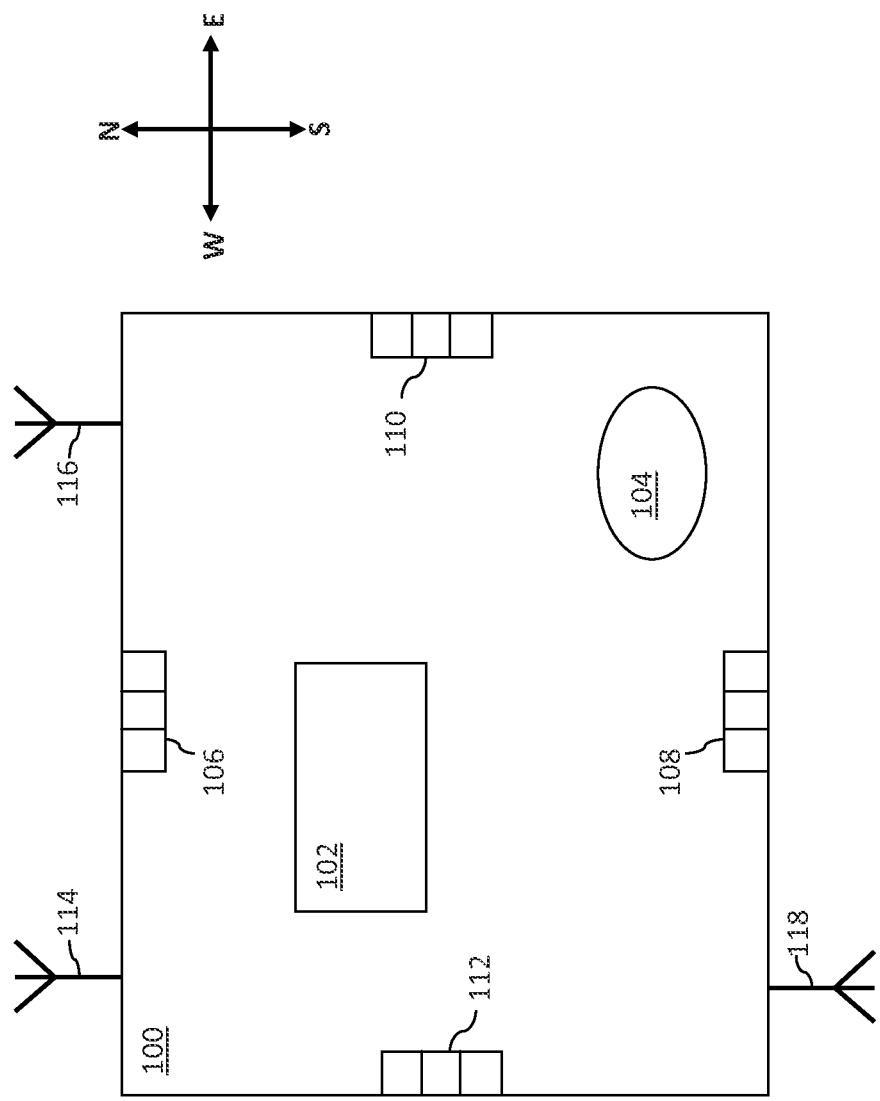
FIG. 1 shows an illustrative embodiment of a network node.

FIG. 1 shows an illustrative embodiment of a network node. In this embodiment, the network node 100 comprises a processing element 102 which contains at least a central processing unit (CPU) and a memory unit. The processing element 102 may execute a computer program stored in the memory unit, for example, or fixed logic in hardware. Furthermore, the network node 100 comprises a sensor 104, i.e. a sensing element able to sense a physical quantity, such as temperature, pressure, etc. In addition, the network node 100 comprises a plurality of visual indicators 106, 108, 110, 112 and an array of three antennas 114, 116, 118 that are placed at half a wavelength apart. This wavelength corresponds to the frequency at which the network operates. The network node 100 may have an arbitrary orientation in space with respect to North. Furthermore, the network node 100 may have an arbitrary height relative to the floor level.

When the network node 100 is placed in a network with other similar types of nodes, then it may have neighbors in the directions North (N), South (S), East (E) and (W) West. Thus, the network node 100 will receive messages from these different directions. The network node 100 may determine the direction from which a message is received by comparing, for example, the phase of the signals received by the three antennas 114, 116, 118, and/or the strength of the signals received by the three antennas 114, 116, 118. The differences between the strength and/or phase of the signals received by the respective antennas 114, 116, 118 thus form the basis to calculate the direction from which signals are received. Optionally, at least one of the antennas may be detachable from the network node, such that the antennas may be set, at least temporarily, further apart from each other. This, in turn, increases the reliability of the determination of said direction, in that the differences between the strength of the received signals are likely to be more significant.

The network node 100 may have an array of visual indicators 106, 108, 110, 112, each of which comprises light-emitting diodes (LEDs) of different colors, for example red, green and yellow, facing each of the four directions, namely, North, South, East and West The programmed logic in the network node 100 may, for example, turn on a green LED in a direction from where a message is received and a red LED from a direction from which no message is received. In this way, a user may look at the color of the lit LEDs and immediately see in which direction the network node 100 is communicating. It is also possible to indicate more precise directions such as North-East and North-Northeast by means of multiple LEDs on the network node 100, emitting different colors and intensity of light. Furthermore, it may be possible that another type of visual indication is given, for example by means of a display unit with electronic ink (e-ink). E-ink display units are particularly suitable for very power-constrained nodes. In the case where a display is added, additional network information may also be displayed to the user. Also, it is possible to use a single multi-colored LED for each direction and, in addition, more than four directions may be used. For example, a node with a circular casing may have a much larger number of visual indicators around its perimeter.

It is also possible that an algorithm in the processing element 102 or in hardware maintains and uses a history of message reception to determine which LEDs have to be lit.

For example, it is possible that when more than 80% of messages are received from the North direction, then the green LED could be lit in that direction and other directions could show either yellow or red LEDs depending on the relative amount of messages received from that particular direction. This embodiment enables a more reliable indication of the communication activities of the node. For example, it takes into account the node's communication with nodes that are temporarily inactive. Temporarily inactive nodes may send many messages to the node when they are active; therefore they may still contribute significantly to the node's communication activities over time.

It is also possible to give a network quality indication based on particular network parameters, such as the bit error rate, the packet error rate and the message error rate. In this way, it is possible for the user to intuitively understand from which directions the node successfully receives messages. Since keeping the LEDs and logging feature operational may cost too much energy, it may not be desirable to have this feature available all the time. Therefore, it may be possible to turn on this feature temporarily when initially installing the network or when needed to monitor network node performance.

Figure 2:
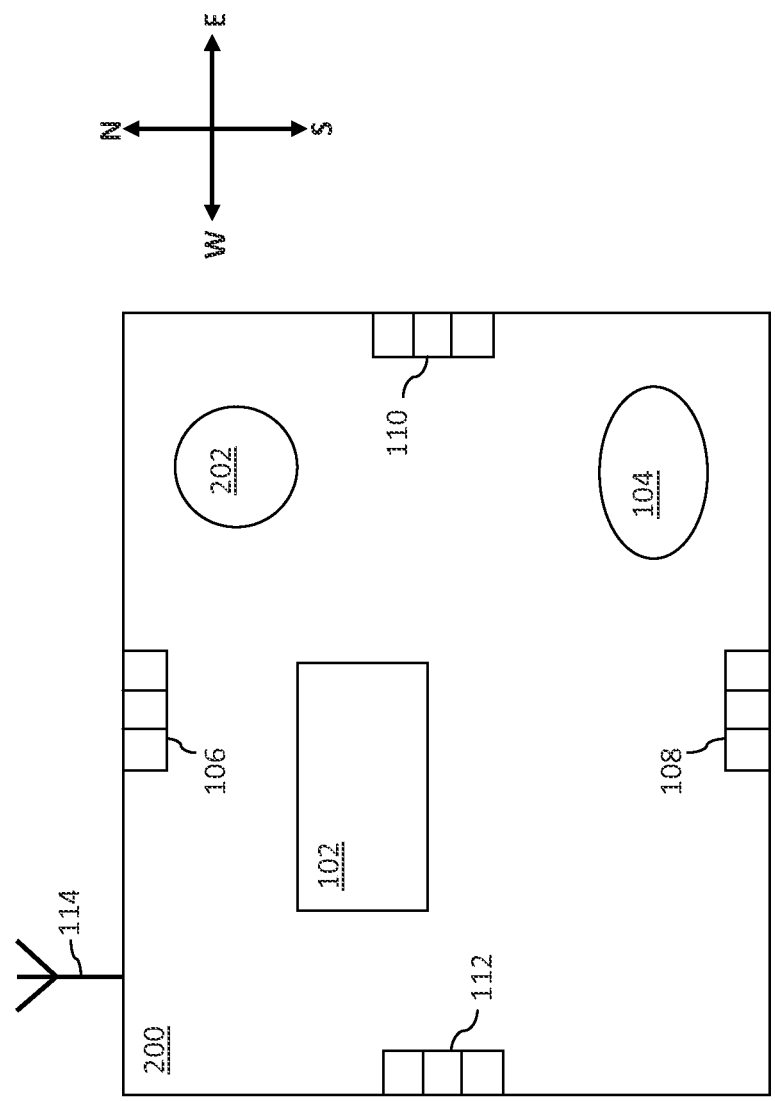
FIG. 2 shows another illustrative embodiment of a network node.

FIG. 2 shows another illustrative embodiment of a network node. In this embodiment, the network node 200 comprises only one antenna 114 and a compass 202. The other components of the network node 100 are the same as the components shown in FIG. 1. The network node 200 is equipped with the compass 202 so that it may determine its orientation with respect to the direction North. The latter facilitates generating the visual indication, for example it facilitates determining which subset of visual indicators 106, 108, 110, 112 has to be lit in order to indicate a communication activity in a certain spatial direction. Alternatively, the orientation of the network node 200 may be pre-set, for example the network node 200 may be aligned with North. In that case, orientation data indicative of the node's pre-set orientation in space may be stored in the node and the compass 202 may be omitted.

Furthermore, at the time of installation, the network node 200 is made aware of its Cartesian coordinates (x, y, z) on the building floor plan, and these coordinates (location data may be stored in the network node 200. For this purpose, a method may be used as described in the European patent application titled "Localization Method, Computer Program Product and Localization Device", filed by applicant NXP B.V. on 5 Dec. 2011 and published as EP 2 602 677 A1 on 12 Jun. 2013. The skilled person will appreciate that, in addition to the x- and y-dimensions in space, the z-dimension may also be relevant because the network nodes may be positioned at different heights in a building, for example.

In operation, when communicating, network nodes may then include their Cartesian coordinates (x, y, z) in outgoing messages, such that a receiving node may determine the direction where a particular message came from and provide a corresponding visual indication. Also, the amount and quality of traffic, for example as represented by the number of correctly received messages by the node, may be used to provide the visual indication.

Figure 3:
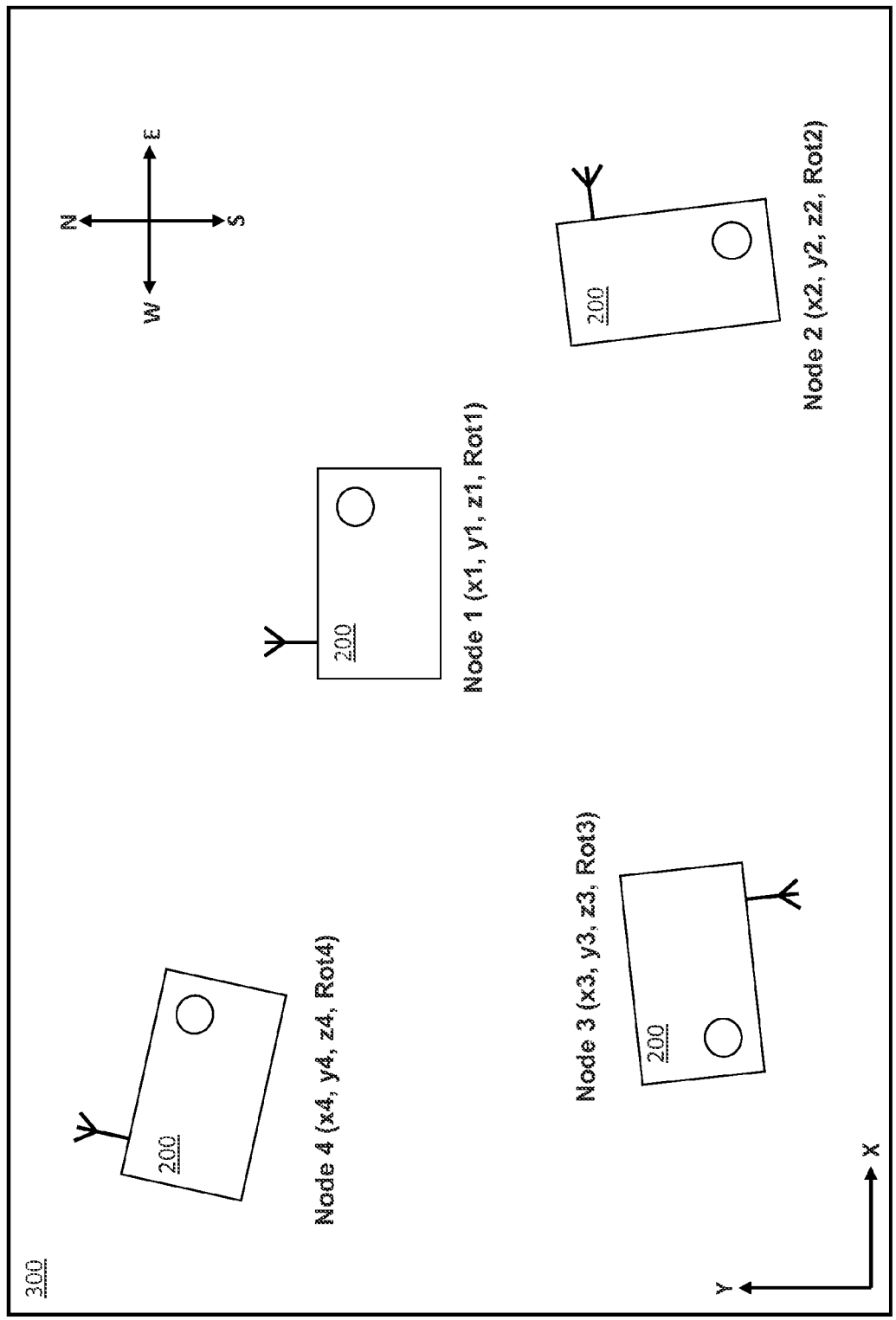
FIG. 3 shows an illustrative embodiment of a wireless sensor network.

FIG. 3 shows an illustrative embodiment of a wireless sensor network. In particular, it shows an example of a network comprising four instances of network nodes 200 within a building perimeter 300. Each of these network nodes 200 have been commissioned with coordinates on the floor plan of a building. When these network nodes 200 communicate in a special mode of operation at the time of installation or network monitoring, they put their coordinates y and z within the building in outgoing messages. A receiving node may then use the data from the received message (x, y and z) and calculate the relative position of the sending node with respect to its own position. This node can then give an indication about the direction from which it received the message using its visual indicator. Optionally, a sending node may put its unique identifier (ID) in its outgoing messages, such that a display unit on a receiving node may display information about the sending node to the user.

The following installation scenario for a network in a home can be conceived:

The user turns on the logging feature when (s)he starts with the installation of the network, in particular the positioning of the network nodes.

The user chooses some locations tor the network nodes in an environment in order to provide best sensing of the physical quantities by the sensors comprised in said nodes. The user may also choose to place some additional network nodes (e.g. routers, which do not contain a sensor) to ensure better coverage of the network. The user may decide to leave the logging feature on for a certain amount of time. This amount of time could be anywhere between a few hours to weeks.

After this amount of time has elapsed, the user looks at the visual indicators on the individual network nodes in order to determine which of these nodes have limited message reception from a certain direction. Based on this input, (s)he may decide to add, remove or relocate some nodes (e.g. routers), for example.

Thus, users may optimize the network by following this procedure, in which they intuitively rearrange nodes in an environment and achieve the best possible result without the need for specialized instruments.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 network node
102 processing element
104 sensor
106 visual indicator
108 visual indicator
110 visual indicator
112 visual indicator
114 antenna
116 antenna
118 antenna
200 network node
202 compass
300 building perimeter

The invention claimed is:

1. A network node for use in a wireless sensor network, said network node comprising:
   a central processing unit;
   a memory circuit;
   a plurality of visual indicators arranged around a perimeter of the network node; and
   a sensor configured to sense physical quantities of an environment;
   wherein the network node is configured to:
      communicate with other network nodes in the wireless sensor network by routing network traffic between the other network nodes in the wireless sensor network,
      determine, based upon communications with other network nodes in the wireless sensor network, a network quality for communication activities of the network node relative to different spatial directions extending from the perimeter of the network node, and
      activate, based upon the determined network quality, at least one of the visual indicators arranged on the perimeter of the network node in a location that corresponds to spatial directions for the determined network quality.

2. A network node as claimed in claim 1, wherein the network node is arranged to determine said network quality by measuring differences in the strength and/or phase of a signal received by different antennas comprised in or attached to said network node.

3. A network node as claimed in claim 2, wherein at least one of the antennas is detachable from the network node.

4. A network node as claimed in claim 1, wherein the network node is arranged to determine said spatial directions by receiving messages from other network nodes, extracting coordinates of the other network nodes from said messages, and using said coordinates to determine the spatial directions from which said messages have been sent.

5. A network node as claimed in claim 1, wherein the network node is arranged to activate said at least one of the visual indicators in dependence on a spatial orientation of the at least one of the visual indicators around the perimeter of the network node.

6. A network node as claimed in claim 5, wherein the spatial orientation of the network node is pre-set.

7. A network node as claimed in claim 5, further comprising a compass which is arranged to determine the spatial orientation of the network node.

8. A network node as claimed in claim 1, wherein said at least one of the visual indicators comprises a plurality of light-emitting diodes.

9. A network node as claimed in claim 1, wherein said at least one of the visual indicators comprises a display unit.

10. A network node as claimed in claim 9, wherein the display unit comprises electronic ink.

11. A network node as claimed claim 1 wherein the a central processing unit is arranged to execute an algorithm that maintains a history of message reception and to use said history for determining the network quality.

12. A network node as claimed in claim 1, further arranged to provide a network quality indication based on an error rate of received messages.

13. A network node as claimed in claim 12, wherein the error rate is one of the group consisting of a bit error rate, a packet error rate and a message error rate.

14. A wireless sensor network comprising a plurality of network nodes, at least one network node being as claimed in claim 1.

15. A method for facilitating positioning of a network node in a wireless sensor network, the method comprising:
   determining a network quality based upon communication activities of the network node in different spatial directions extending from the network node, the communication activities including routing of communications between other network nodes in the wireless sensor network, and
   activating at least one visual indicator which provides a visual indication of the network quality for said communication activities in one of the different spatial directions.

* * * * *